US011905494B2

(12) United States Patent
Nefkens et al.

(10) Patent No.: US 11,905,494 B2
(45) Date of Patent: Feb. 20, 2024

(54) FABRIC DETERGENT FORMULATION

(71) Applicant: Celanese International Corporation, Irving, TX (US)

(72) Inventors: Sylvia Nefkens, Amsterdam (NL); Aukje van Kooij, Haarlem (NL)

(73) Assignee: Celanese International Corporation, Irving, TX (US)

( * ) Notice: Subject to any disclaimer, the term of this patent is extended or adjusted under 35 U.S.C. 154(b) by 396 days.

(21) Appl. No.: 17/166,213

(22) Filed: Feb. 3, 2021

(65) Prior Publication Data

US 2021/0246398 A1 Aug. 12, 2021

Related U.S. Application Data

(60) Provisional application No. 63/084,045, filed on Sep. 28, 2020, provisional application No. 62/972,204, filed on Feb. 10, 2020.

(51) Int. Cl.
*C11D 3/20* (2006.01)
*C11D 11/00* (2006.01)

(52) U.S. Cl.
CPC ........ *C11D 3/2079* (2013.01); *C11D 11/0017* (2013.01)

(58) Field of Classification Search
CPC .......................... C11D 3/2079; C11D 11/0017
See application file for complete search history.

(56) References Cited

U.S. PATENT DOCUMENTS

| | | | |
|---|---|---|---|
| 3,860,536 | A | 1/1975 | Landwerlen et al. |
| 5,057,326 | A | 10/1991 | Sampson |
| 5,336,500 | A | 8/1994 | Richter et al. |
| 6,841,572 | B2 | 1/2005 | Horst et al. |
| 7,468,105 | B2 | 12/2008 | Andreas |
| 7,537,776 | B1 | 5/2009 | Beilfuss et al. |
| 8,197,833 | B2 | 6/2012 | Beilfuss et al. |
| 8,501,206 | B2 | 8/2013 | Beilfuss et al. |
| 8,563,017 | B2 | 10/2013 | Cunningham et al. |
| 9,861,122 | B2 | 1/2018 | Kang et al. |
| 10,119,100 | B2 | 11/2018 | Ewell et al. |
| 10,357,442 | B2 | 7/2019 | Schelges et al. |
| 11,001,793 | B2 | 5/2021 | Piorkowski |
| 2019/0024027 | A1 | 1/2019 | Dowdle |

FOREIGN PATENT DOCUMENTS

| | | | |
|---|---|---|---|
| CN | 108865533 | A | 11/2018 |
| EP | 1 390 010 | B1 | 4/2007 |
| WO | WO 2007/033731 | A1 | 3/2007 |
| WO | WO 2012/052306 | A1 | 4/2012 |
| WO | WO 2018/033406 | A1 | 2/2018 |
| WO | WO 2019/166203 | A1 | 9/2019 |

OTHER PUBLICATIONS

Nefkens, et al., "Sorbates: Nature Identical, Non-Sensitizing, Label Friendly Preservatives for Home Care Detergent Products," *SOFW Journal* Apr. 2019, vol. 1456, Apr. 15, 2019, 6 pages.
Siegert, Wolfgang, "Comparison of microbial challenge testing methods for cosmetics," *Household and Personal Care Today*, vol. 8(2), Mar./Apr. 2013, 8 pages.
Technical Application Bulletin for Kalaguard® SB from Emerald Performance Materials® Kalama Chemical, Sep. 2018, 4 pages.
International Search Report and Written Opinion for PCT/US2021/017169 dated Apr. 22, 2021, 8 pages.

*Primary Examiner* — Sikarl A Witherspoon
(74) *Attorney, Agent, or Firm* — Dority & Manning, P.A.

(57) ABSTRACT

A fabric detergent formulation is provided. The formulation comprises a preservative system that includes one or more sorbates in an amount of from about 0.01 wt. % to about 0.8 wt. % of the fabric detergent formulation; one or more anionic surfactants, wherein the weight ratio of the anionic surfactants to the sorbates is about 10 or more; and a solvent system that includes water in an amount of from about 50 wt. % to 100 wt. % of the fabric detergent formulation. The pH of the fabric detergent formulation is about 6.5 or more.

19 Claims, No Drawings

FABRIC DETERGENT FORMULATION

CROSS REFERENCE TO RELATED APPLICATIONS

The present application claims filing benefit of U.S. Provisional Patent Application Ser. No. 62/972,204 having a filing date of Feb. 10, 2020 and U.S. Provisional Patent Application Ser. No. 63/084,045 having a filing date of Sep. 28, 2020, which are incorporated herein by reference in their entirety.

BACKGROUND OF THE INVENTION

Isothiazolinones, such as methylisothiazolinone ("MIT"), chloromethylisothazolinone ("OMIT"), and benzisothiazolinone ("BIT"), have traditionally been used as preservatives in many fabric detergent formulations. Recently, however, the use of such compounds has come under pressure due to regulatory changes, as well as a growing negative image related to their skin sensitization potential. As such, efforts have been made to consider various alternatives to isothiazolinones to preserve fabric detergents. In this regard, sorbic acid and its salts ("sorbates"), such as potassium sorbate, have a long history of safe use in food, pharmaceutical and personal care applications, and are considered nature identical and are environmentally friendly. Unfortunately, the use of sorbates in most fabric detergents has been limited by the low pH levels that are typically required to ensure sufficient antimicrobial activity. Namely, sorbic acid is a weak acid that only partially dissociates in water. Because the undissociated acid is generally understood to be the most active against micro-organisms, low pH values (e.g., 5.5 or less) are generally required to ensure that a sufficient degree of undissociated acid remains present in the formulation. These low pH values are, however, generally not desired in fabric detergents. Thus, in light of the problem noted above, a current need exists for a fabric detergent formulation that can have a higher pH value and be generally free of isothiazolinones, but yet still able to withstand microbial challenges and pass preservative efficacy testing.

SUMMARY OF THE INVENTION

In accordance with one embodiment of the present invention, a fabric detergent formulation is disclosed that comprises a preservative system that includes one or more sorbates in an amount of from about 0.01 wt. % to about 0.8 wt. % of the fabric detergent formulation; one or more anionic surfactants, wherein the weight ratio of the anionic surfactants to the sorbates is about 10 or more; and a solvent system that includes water in an amount of from about 50 wt. % to 100 wt. % of the fabric detergent formulation. The pH of the fabric detergent formulation is about 6.5 or more.

Other features and aspects of the present invention are set forth in greater detail below.

DETAILED DESCRIPTION

It is to be understood by one of ordinary skill in the art that the present discussion is a description of exemplary embodiments only, and is not intended as limiting the broader aspects of the present invention.

Generally speaking, the present invention is directed to a fabric detergent formulation that has a relatively high pH level and contains a preservative system that includes at least one sorbate preservative (e.g., potassium sorbate) in an amount of from about 0.01 wt. % to about 0.8 wt. %, in some embodiments from about 0.05 wt. % to about 0.6 wt. %, in some embodiments from about 0.1 wt. % to about 0.5 wt. %, and in some embodiments, from about 0.2 wt. % to about 0.4 wt. % of the formulation. Despite containing a sorbate preservative in such a concentration, the present inventors have discovered that through selective control over the particular nature and concentration of the components employed in the formulation, a high degree of preservative efficacy can be reached even at relatively high pH levels, such as about 6.5 or more, in some embodiments from about 6.5 to about 10, and in some embodiments, from about 7 to about 8.5. More particularly, the fabric detergent formulation also contains an anionic surfactant, and the weight ratio of anionic surfactants to sorbates employed in the formulation is generally from about 10 or more, in some embodiments about 15 or more, in some embodiments from about 20 to about 300, in some embodiments from about 25 to about 250, and in some embodiments, from about 30 to about 100. Without intending to be limited by theory, it is believed that selective control over the relative concentration of the anionic surfactants can enhance the overall performance of the sorbate, which allows it to achieve a relatively high degree of antimicrobial efficacy despite the fact that it is present in low concentrations and that the pH of the formulation is relatively high.

The fabric detergent formulation may thus exhibit preservative efficacy against a variety of microorganisms after exposure thereto, such as bacteria, fungi (e.g., molds, such as *Aspergillus brasiliensis*, yeasts, such as *Candida Albicans*, etc.), and so forth. For example, the formulation may be exhibit a preservative effect after exposure to gram negative rods (e.g., Entereobacteria); gram positive rods (e.g., *Bacillus, Clostridium*, etc.); gram positive cocci (e.g., *Staphylococcus, Streptococcus*, etc.); Particular species of bacteria that may be inhibited include *Escherichia coli* (gram negative rod), *Klebsiella pneumonia* (gram negative rod), *Staphyloccus aureus* (gram positive cocci), and *Psuedomonas aeruginosa* (gram negative rod). For instance, after exposure in the fabric detergent formulation, a log reduction of at least 1 (90% reduction), in some embodiments at least 2 (99% reduction), in some embodiments at least 3 (99.9% reduction), and in some embodiments, at least 4 (99.99% reduction), may be demonstrated. The desired log reduction may also be achieved within a substantial period of time, such as about 1 day or more, in some embodiments 2 days or more, in some embodiments, for about 5 days to about 30 days (e.g., 7 days, 14 days, or 28 days). For instance, the fabric detergent formulation may exhibit a log reduction of at least 2, and preferably at least 3, at 2 days, 7 days, 14 days, and/or 28 days after exposure to bacteria (e.g., *S. aureus, E. coli*, and/or *P. aeruginosa*) in accordance with European Pharmacopoeia 7.0, Efficacy of Antimicrobial Preservation (5.1.3) (2011). The fabric detergent formulation may likewise exhibit a log reduction of at least 1, and preferably at least 2, at 14 days and/or 28 days after exposure to fungi (e.g., *C. albicans* and/or *A. brasiliensis*) in accordance with European Pharmacopoeia 7.0, Efficacy of Antimicrobial Preservation (5.1.3) (2011).

Various embodiments of the present invention will now be described in more detail.

I. Fabric Detergent Formulation

A. Preservative System

As indicated above, the preservative system employed in the fabric detergent formulation includes at least one sorbate preservative in an amount of from about 0.01 wt. % to about 0.8 wt. %, in some embodiments from about 0.05 wt. % to about 0.6 wt. %, in some embodiments from about 0.1 wt. % to about 0.5 wt. %, and in some embodiments, from about 0.2 wt. % to about 0.4 wt. % of the formulation. The sorbate preservative may be sorbic acid or any known sorbate salt having the desired degree of efficacy, such as an alkali metal sorbate (e.g., potassium sorbate, sodium sorbate, etc.), ammonium sorbate, tetraalkylammonium sorbate (e.g., tetramethylammonium sorbate), and so forth. Potassium sorbate is particularly suitable for use in the present invention.

Of course, additional preservatives may also be employed in the preservative system, such as benzoates (e.g., sodium benzoate, potassium benzoate, ammonium benzoate, etc.), phenoxy alcohols (e.g., phenyoxyethanol), benzoic esters (e.g., methylparaben, propylparaben, butylparaben, ethylparaben, isopropylparaben, isobutylparaben, benzylparaben, etc.); and so forth. When employed, the relative concentration of such additional preservative(s) may be selectively controlled to ensure the desired degree of antimicrobial efficacy at relatively high pH levels. The weight ratio of additional preservative(s) to the sorbate(s) within the preservative system may, for instance, range from about 0.5 to about 20, in some embodiments from about 1 to about 15, and in some embodiments, from about 2 to about 10. For instance, the additional preservative(s) may be present in an amount of from about 0.1 wt. % to about 5 wt. %, in some embodiments from about 0.2 wt. % to about 4 wt. %, and in some embodiments, from about 0.5 wt. % to about 2 wt. % of the formulation. The entire preservative system may likewise be present in an amount of from about 0.05 wt. % to about 8 wt. %, in some embodiments from about 0.1 wt. % to about 6 wt. %, and in some embodiments, from about 0.2 wt. % to about 5 wt. % of the formulation. While additional preservatives can be employed, it should be understood that the fabric detergent formulation is desirably generally free of isothiazolinones, such as methylisothiazolinone, chloromethylisothazolinone, and benzisothiazolinone. For example, the formulation may contain no isothiazolinones or, if they are present at all, such compounds are present in an amount of no more than about 0.5 wt. %, in some embodiments no more than about 0.1 wt. %, and in some embodiments, no more than about 0.01 wt. % of the formulation.

B. Anionic Surfactant

As noted above, the fabric detergent formulation also contains at least one anionic surfactant. Various suitable anionic surfactants may be employed, such as alkyl sulfates (e.g., fatty alcohol sulfates), alkyl ether sulfates (e.g., fatty alcohol ether sulfates), alkyl sulfonates (e.g., alkyl benzene sulfonates), ester sulfonates (sulfofatty acid esters), lignin sulfonates, fatty acid cyanamides, sulfosuccinic acid surfactants, acylaminoalkane sulfonates, fatty acid sarcosinates, ether carboxylic acids and alkyl (ether) phosphates, alkyl carboxylates (soaps), etc., as well as mixtures thereof.

Alkyl ether sulfates (fatty alcohol ether sulfates) are particularly suitable for use in the fabric detergent formulation. Such sulfates are generally salts derived from an alkoxylated alcohol, which is in turn formed from the reaction product of an alkylene oxide (e.g., ethylene oxide and/or propylene oxide) with an aliphatic straight-chain, branched, acyclic, cyclic, saturated or unsaturated alcohol. Particularly suitable alcohols for this purpose are straight-chain, acyclic, saturated, alcohols containing from 6 to 22, in some embodiments from 8 to 18, and in some embodiments, from 10 to 16 carbon atoms. The degree of alkoxylation may generally vary. For example, the alkoxylated alcohol typically contains from 1 to 4 alkylene oxide (e.g., ethylene oxide) units. The cation of such alkyl ether sulfate salts may be an alkali metal (e.g., sodium or potassium), ammonium, $C_1$-$C_4$ alkylammonium (e.g., mono-, di-, tri-), or $C_1$-$C_3$ alkanolammonium (e.g., mono-, di-, tri). One particular example of an alkyl ether sulfate may include a lauryl ether sulfate ("laureth sulfate"), such as sodium laureth sulfate. Alkyl sulfates (fatty alcohol sulfates) may also be suitable for use in the fabric detergent formulation. Such sulfates are generally salts derived from an alcohol, such as an aliphatic straight-chain, branched, acyclic, cyclic, saturated or unsaturated alcohol. Particularly suitable alcohols for this purpose are straight-chain, acyclic, saturated, alcohols containing from 6 to 22, in some embodiments from 8 to 18, and in some embodiments, from 10 to 16 carbon atoms. The cation of such alkyl sulfate salts may be an alkali metal (e.g., sodium or potassium), ammonium, $C_1$-$C_4$ alkylammonium (e.g., mono-, di-, tri-), or $C_1$-$C_3$ alkanolammonium (e.g., mono-, di-, tri). Examples of alkyl sulfates may include a lauryl sulfate, octyl sulfate, 2-ethylhexyl sulfate, decyl sulfate, dodecyl sulfate, myristyl sulfate, cetyl sulfate, and so forth.

Alkyl sulfonates may also be employed in the fabric detergent formulation. Such sulfonates are generally salts derived from aliphatic straight-chain or branched, acyclic or cyclic, saturated or unsaturated alkyl radical having from 6 to 22, in some embodiments from 9 to 20, and in some embodiments, from 12 to 18 carbon atoms. The alkyl sulfonate may be a saturated alkane sulfonate, unsaturated olefin sulfonate, or an ether sulfonate. Particularly suitable are alkyl benzene sulfonates that contain a benzene ring substituted with a sulfonic or sulfonate group an aliphatic straight-chain or branched, acyclic, saturated or unsaturated alkyl side chain having from 6 to 22, in some embodiments from 8 to and in some embodiments, from 12 to 16 carbon atoms. The cation of such alkyl sulfonates may be an alkali metal (e.g., sodium or potassium), ammonium, $C_1$-$C_4$ alkylammonium (e.g., mono-, di-, tri-), or $C_1$-$C_3$ alkanolammonium (e.g., mono-, di-, tri). The alkyl sulfonate can be introduced into the formulation directly as a salt. In one embodiment, for example, the alkyl sulfonate may be sodium dodecyl benzene sulfonate. Alternatively, the alkyl sulfonate may also be introduced into the formulation as an acid (e.g., alkyl sulfonic acid) that is then neutralized with a separately introduced base (e.g., sodium hydroxide) to form the sulfonate. In one embodiment, for example, dodecyl benzene sulfonic acid and sodium hydroxide may be added separately to the solvent system.

In addition to those identified above, other anionic surfactants may also be employed in the fabric detergent formulation. For example, sulfosuccinic acid surfactants may be employed, such as sulfosuccinates, sulfosuccinamates and sulfosuccinamides. Sulfosuccinates are typically salts of the mono- and diesters of sulfosuccinic acid, sulfosuccinamates are typically salts of monoamides of sulfosuccinic acid, and sulfosuccinamides are typically salts of diamides of sulfosuccinic acid. The salts are typically alkali metal salts (e.g., sodium, lithium, etc.), ammonium salts, trialkalkanolammonium salts, etc. In the sulfosuccinates, one or both carboxyl groups of sulfosuccinic acid are typically provided with one or two identical or different unbranched or branched, saturated or unsaturated, acyclic or cyclic, optionally alkoxylated alcohols having from 4 to 22, in some embodiments from 6 to 20, and in some embodiments, from about 10 to 16 carbon atoms. Particularly preferred are the esters of alkoxylated fatty alcohols (e.g., with ethylene oxide and/or propylene oxide) having a degree of alkoxylation of from 1 to in some embodiments from 1 to 15, and in some embodiments, from 1 to 6.

Regardless of the particular type chosen, the total amount of anionic surfactants in the fabric detergent formulation typically ranges from about 2 wt. % to about 30 wt. %, in some embodiments from about 4 wt. % to about 25 wt. %, and in some embodiments, from about 5 wt. % to about 20 wt. % of the formulation. A single anionic surfactant or blend of anionic surfactants may be employed. In one embodiment, for instance, a first anionic surfactant (e.g., alkyl ether sulfate) may be employed in combination with a second anionic surfactant (e.g., alkyl sulfonate). The first anionic surfactant may be employed in an amount of from about 1 wt. % to about 15 wt. %, in some embodiments from about 2 wt. % to about 20 wt. %, and in some embodiments, from about 3 wt. % to about 6 wt. % of the formulation, and the second anionic surfactant may likewise be employed in an amount of from about 1 wt. % to about 15 wt. %, in some embodiments from about 2 wt. % to about 20 wt. %, and in some embodiments, from about 3 wt. % to about 6 wt. % of the formulation.

C. Other Surfactants

Besides anionic surfactants, other surfactants may also be employed in the fabric detergent formulation. For instance, nonionic surfactants may be employed, such as in an amount of about 1 wt. % to about 25 wt. %, in some embodiments from about 2 wt. % to about 20 wt. %, and in some embodiments, from about 3 wt. % to about 15 wt. % of the formulation. Nonionic surfactants typically have a hydrophobic base, such as a long chain alkyl group or an alkylated aryl group, and a hydrophilic chain containing a certain number (e.g., 1 to about of ethoxy and/or propoxy moieties. Suitable nonionic surfactants may include, for instance, alkoxylates, such as polyglycol ethers, fatty alcohol polyglycol ethers, alkylphenol polyglycol ethers, end-capped polyglycol ethers, mixed ether and hydroxy mixed ethers and fatty acid polyglycol esters, block polymers of ethylene oxide and propylene oxide, etc.; fatty acid alkanolamides, such as cocamidopropylamine oxides (e.g., cocoamidopropylamine oxide); fatty acid polyglycols, sugar surfactants, such as alkyl glucose esters, aldobionamides, gluconamides (sugar acid amides), glycerol amides, glycerol glycolipids, polyhydroxy fatty acid amide sugar surfactants (sugar amides), alkyl polyglycosides, etc.); biosurfactants, such as glycolipids; and so forth, as well as mixtures thereof. Particularly suitable alkoxylates may include, for instance, castor oil ethoxylates, ceteoleath alcohol ethoxylates, ceteareth alcohol ethoxylates, decyl alcohol ethoxylates, dinoyl phenol ethoxylates, dodecyl phenol ethoxylates, end-capped ethoxylates, lauryl alcohol ethoxylates, nonyl phenol ethoxylates, octyl phenol ethoxylates, sorbitan ester ethoxylates, stearic acid ethoxylates, stearyl amine ethoxylates, synthetic alcohol ethoxylates, tallow oil fatty acid ethoxylates, tridecanol ethoxylates, polyoxyethylene sorbitols, and mixtures thereof.

Other suitable surfactants, such as amphoteric surfactants, cationic surfactants, zwitterionic surfactants, etc., may also be employed. Amphoteric surfactants, for instance, may be derivatives of secondary and tertiary amines having aliphatic radicals that are straight chain or branched, wherein one of the aliphatic substituents contains from about 8 to 18 carbon atoms and at least one of the aliphatic substituents contains an anionic water-solubilizing group, such as a carboxy, sulfonate, or sulfate group. Some examples of amphoteric surfactants may include betaines, such as alkyl betaines (e.g., capryl/capramidopropyl betaine), alkylamido betaines (e.g., cocoamidopropylbetaine), imidazolium betaines, carbobetaines, sulfobetaines (e.g., 3-(3-cocoamido-propyl-dimethylammonium-2-hydroxypropanesulfonate betaine), phosphobetaines, etc.; alkylamidoalkylamines; alkyl amino acids (e.g., amino propionates); acylated amino acid (e.g., sodium cocoylglutamate, lauroylglutamic acid, capryloylglycine, etc.); and so forth, as well as mixtures thereof.

D. Chelating Agent

Because the fabric detergent formulation can sometimes be exposed to metallic impurities (e.g., calcium ions) during use, a metal chelating agent may be employed in the solution, such as in an amount from about 0.01 wt. % to about 5 wt. %, in some embodiments from about 0.02 wt. % to about 2 wt. %, and in some embodiments, from about 0.05 wt. % to about 1 wt. % of the fabric detergent formulation. The chelating agent may include, for instance, aminocarboxylic acids (e.g., ethylenediaminetetraacetic acid) and salts thereof, hydroxycarboxylic acids (e.g., citric acid, tartaric acid, ascorbic acid, etc.) and salts thereof, polyphosphoric acids (e.g., tripolyphosphoric acid, hexametaphosphoric acid, etc.) and salts thereof, cyclodextrin, and so forth. Desirably, the chelating agent is capable of forming multiple coordination complexes with metal ions to reduce the likelihood that any of the free metal ions will interact with the sorbate preservative. In one embodiment, for example, a chelating agent containing two or more aminodiacetic acid groups or salts thereof may be utilized. Aminodiacetic acid groups generally have the following structure:

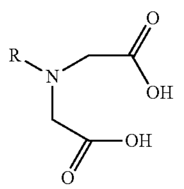

One example of such a chelating agent is ethylenediaminetetraacetic acid (EDTA). Examples of suitable EDTA salts include calcium-disodium EDTA, diammonium EDTA, disodium and dipotassium EDTA, triethanolamine EDTA, trisodium and tripotassium EDTA, tetrasodium and tetrapotassium EDTA. Still other examples of similar aminodiacetic acid-based chelating agents include, but are not limited to, butylenediaminetetraacetic acid, 1,2-cyclohexylenediaminetetraacetic acid, diethylenetriaminepentaacetic acid, ethylenediaminetetrapropionic acid, (hydroxyethyl)ethylenediaminetriacetic acid, N N, N',N'-ethylenediaminetetra(methylenephosphonic)acid, triethylenetetraminehexaacetic acid, 1,3-diamino-2-hydroxypropane-N,N,N',N'-tetraacetic acid, methyliminodiacetic acid, propylenediaminetetraacetic acid, tetrasodium glutamate diacetate, and so forth.

E. Solvent System

To form the fabric detergent formulation, one or more of the components are typically dissolved or dispersed in a solvent system that includes one or more solvents. For example, one or more of the above-mentioned components may be mixed with a solvent, either sequentially or simultaneously. Although the actual concentration of the solvent system employed will generally depend on the nature of the fabric detergent formulation and its components, it is nonetheless typically present in an amount from about 50 wt. % to about 99.9 wt. %, in some embodiments from about 60 wt. % to about 99 wt. %, and in some embodiments, from about 75 wt. % to about 98 wt. % of the fabric detergent formulation. Typically, water is employed as the primary solvent in the fabric detergent formulation. That is, water generally constitutes from about 50 wt. % to 100 wt. %, and in some embodiments, from about 80 wt. % to 100 wt. % of solvents employed in the formulation. Of course, other suitable solvents may also be employed, such as glycols, such as propylene glycol, butylene glycol, triethylene glycol, hexylene glycol, polyethylene glycols, ethoxydiglycol, and dipropyleneglycol; alcohols, such as ethanol, n-propanol, and isopropanol; triglycerides; ethyl acetate; acetone; triacetin; and combinations thereof.

F. Other Components

A wide variety of other components may also be employed in the fabric detergent formulation as is known in the art, such as rheological modifiers, pH modifiers, antioxidants, stabilizers (e.g., UV stabilizers), anti-redeposition agents, dyes, dye transfer inhibitors, soil release polymers, optical brighteners, enzymes, enzyme stabilizers, microcapsules, builders (e.g., sodium citrate), fragrances, pearlescent agents, corrosion inhibitors, disinfectants, etc.

To help achieve the desired pH level, for instance, one or more pH modifiers may be employed in the formulation. Basic pH modifiers may, for instance, be employed to raise the pH level. Examples of suitable basic pH modifiers may include, for instance, ammonia; mono-, di-, and tri-alkyl amines; mono-, di-, and tri-alkanolamines; alkali metal and alkaline earth metal hydroxides; alkali metal and alkaline earth metal silicates; and mixtures thereof. Specific examples of basic pH modifiers are ammonia; sodium, potassium, and lithium hydroxide; sodium, potassium, and lithium meta silicates; monoethanolamine; triethylamine; isopropanolamine; diethanolamine; and triethanolamine. Likewise, acidic pH modifiers may be employed to lower the pH level if needed. Examples of suitable acidic pH modifiers may include, for instance, mineral acids; and carboxylic acids; and polymeric acids. Specific examples of suitable mineral acids are hydrochloric acid, nitric acid, phosphoric acid, and sulfuric acid. Specific examples of suitable carboxylic acids are citric acid, glycolic acid, lactic acid, maleic acid, malic acid, succinic acid, glutaric acid, benzoic acid, malonic acid, salicylic acid, gluconic acid, and mixtures thereof. Specific examples of suitable polymeric acids include straight-chain poly(acrylic) acid and its copolymers (e.g., maleic-acrylic, sulfonic-acrylic, and styrene-acrylic copolymers), cross-linked polyacrylic acids having a molecular weight of less than about 250,000, poly(methacrylic) acid, and naturally occurring polymeric acids such as carageenic acid, carboxymethyl cellulose, and alginic acid. When employed, the pH modifier may be present in any effective amount needed to achieve the desired pH level. For example, in some embodiments, pH modifiers may be present in an amount from about 0.001 wt. % to about 5 wt. %, in some embodiments from about 0.01 wt. % to about 2 wt. %, and in some embodiments, from about 0.1 wt. % to about 1 wt. % of the fabric detergent formulation.

The viscosity of the fabric detergent formulation is also typically controlled within a range of from about 50 to about 800 centipoise (cP), in some embodiments from about 100 to about 600 cP, and in some embodiments, from about 150 to about 400 cP, as determined with a Brookfield RV viscometer (spindle #2, 60 rpm). If desired, rheological modifiers may be employed in the fabric detergent formulation to increase or decrease viscosity to the desired level. Examples of such rheological modifiers may include, for instance, inorganic and/or organic salts. Suitable inorganic salts generally include water-soluble halides, sulfates, sulfites, carbonates, hydrogen carbonates, nitrates, nitrites, phosphates and/or oxides of alkali metals, alkaline earth metals, aluminum, transition metals, or ammonium. Halides and sulfates of alkali metals are particularly suitable, such as sodium chloride, potassium chloride, sodium sulfate, potassium sulfate, and mixtures thereof. Suitable organic salts may include water-soluble alkali metal, alkaline earth metal, ammonium, aluminum and/or transition metal salts of carboxylic acids, such as formates, acetates, propionates, citrates (e.g., sodium citrate), malates, tartrates, succinates, and so forth. In some embodiments, rheological modifiers may be present in an amount from about 0.001 wt. % to about 5 wt. %, in some embodiments from about 0.01 wt. % to about 2 wt. %, and in some embodiments, from about 0.1 wt. % to about 1 wt. % of the fabric detergent formulation.

The present invention may be better understood with reference to the following examples.

Test Methods

Preservative Efficacy: The preservative efficacy of a fabric detergent formulation may be determined in accordance with European Pharmacopoeia 7.0, Efficacy of Antimicrobial Preservation (5.1.3) (2011). This test method is based on the inoculation of the formulation with a known concentration of 5 relevant strains of microorganisms, specifically *S. aureus, E. coli, P. aeruginosa, C. albicans*, and *A. brasiliensis*. The remaining concentration of microorganisms is determined at defined intervals of 2 days, 7 days, 14 days, and 28 days. For each time and each microorganism, test sample colonies are counted at each specified interval to determine the amount of microorganisms remaining. The log reduction of each microorganism at each interval is then calculated and reported, and the effectiveness of the preservative formulation is determined by comparison to the acceptance criteria as set forth below:

Criteria A

For bacteria, the formulation must demonstrate a log reduction of at least 2 from the initial count at 2 days, a log reduction of at least 3 from the initial count at 7 days, and show no increase from the initial count at 7 days to the initial count at 28 days. For fungi (*C. albicans* and *A. brasiliensis*), the formulation must demonstrate a log reduction of at least 2 from the initial count at 14 days and show no increase from the initial count at 14 days to the initial count at 28 days.

Criteria B

For bacteria, the formulation must demonstrate a log reduction of at least 3 from the initial count at 14 days and show no increase from the initial count at 14 days to the initial count at 28 days. For fungi (*C. albicans* and *A. brasiliensis*), the formulation must demonstrate a log reduction of at least 1 from the initial count at 14 days and show no increase from the initial count at 14 days to the initial count at 28 days.

Examples 1-6

Samples 1-6 were formed from deionized water, dodecylbenzene sulfonic acid neutralized with sodium hydroxide (anionic surfactant), sodium laureth sulfate (anionic surfactant), alcohol $C_{12}$-$C_{13}$ ethoxylate 7EO (nonionic surfactant), tetrasodium glutamate diacetate (chelating agent), and a preservative system. The preservative systems tested were potassium sorbate (Example 1), sodium benzoate (Example 2), phenoxyethanol (Example 3), a blend of potassium sorbate and sodium benzoate (Example 4), a blend of potassium sorbate and phenoxyethanol (Example 5), and a blend of potassium sorbate, sodium benzoate, and phenoxyethanol (Example 6). Each formulation had a pH of 7.0 and had a viscosity of 270 to 300 cP as determined using a Brookfield RV viscometer (spindle #2, 60 rpm). The viscosity was obtained through the addition of sodium chloride (NaCl) in a quantity sufficient to reach the desired viscosity level. The ingredients and relative concentration of the formulations are set forth in the table below:

| | Example | | | | | | |
|---|---|---|---|---|---|---|---|
| | Control | 1 | 2 | 3 | 4 | 5 | 6 |
| Deionized water (wt. %) | q.s. 100 wt. % | q.s. 100 wt. % | q.s. 100 wt. % | q.s. 100 wt. % | q.s. 100 wt. % | q.s. 100 wt. % | q.s. 100 wt. % |
| Dodecylbenzene sulfonic acid (wt. %) | 5 | 5 | 5 | 5 | 5 | 5 | 5 |
| NaOH (wt. %) | 0.7 | 0.7 | 0.7 | 0.7 | 0.7 | 0.7 | 0.7 |
| Sodium Laureth Sulfate (70%) (wt. %) | 5 | 5 | 5 | 5 | 5 | 5 | 5 |
| Alcohol $C_{12}$-$C_{13}$ ethoxylate 7EO (wt. %) | 5 | 5 | 5 | 5 | 5 | 5 | 5 |
| Tetrasodium Glutamate Diacetate (47%) (wt. %) | 0.1 | 0.1 | 0.1 | 0.1 | 0.1 | 0.1 | 0.1 |
| Potassium Sorbate (wt. %) | — | 0.2 | — | — | 0.2 | 0.2 | 0.2 |
| Sodium Benzoate (wt. %) | — | — | 1 | — | 1 | — | 1 |
| Phenoxyethanol (wt. %) | — | — | — | 1 | — | 1 | 1 |

In accordance with European Pharmacopoeia 7.0, Efficacy of Antimicrobial Preservation (5.1.3) (2011), the formulations were tested for efficacy against *P. aeruginosa, S. aureus, E. coli, C. albicans*, and *A. brasiliensis* in inoculation having a concentration of viable bacteria per gram equal to $2.9\times10^5$, $4.5\times10^5$, $6.2\times10^5$, $4.2\times10^5$, and $3.1\times10^5$, respectively. The formulations were initially tested over a 28-day period.

TABLE 1

| Efficacy of Control Sample | | | | | | | | | | | | |
|---|---|---|---|---|---|---|---|---|---|---|---|---|
| | $2^{nd}$ Day | | | $7^{th}$ Day | | | $14^{th}$ Day | | | $28^{th}$ Day | | |
| | Conc (cfu/g) | % Red. | Log Red. | Conc (cfu/g) | % Red. | Log Red. | Conc (cfu/g) | % Red. | Log Red. | Conc (cfu/g) | % Red. | Log Red. |
| *P. aeruginosa* | 1.6E05 | 45 | 0.26 | 1.4E05 | 52 | 0.32 | 2.0E05 | 31 | 0.16 | 2.0E04 | 93 | 1.16 |
| *S. aureus* | 8.7E04 | 81 | 0.71 | 6.3E04 | 86 | 0.85 | 1.1E05 | 76 | 0.61 | 6.0E03 | 99 | 1.88 |
| *E. Coli* | 1.2E05 | 81 | 0.71 | 1.3E05 | 79 | 0.68 | 1.6E05 | 74 | 0.59 | 3.9E04 | 94 | 1.20 |
| *C. albicans* | 6.6E04 | 84 | 0.80 | 8.7E04 | 79 | 0.68 | 1.2E05 | 71 | 0.54 | 1.8E05 | 57 | 0.37 |
| *A. brasiliensis* | 8.6E04 | 72 | 0.56 | 6.9E04 | 78 | 0.65 | 1.1E05 | 65 | 0.45 | 8.7E04 | 72 | 0.55 |

TABLE 2

| Efficacy of Example 1 (0.2 wt. % Potassium Sorbate) | | | | | | | | | | | | |
|---|---|---|---|---|---|---|---|---|---|---|---|---|
| | $2^{nd}$ Day | | | $7^{th}$ Day | | | $14^{th}$ Day | | | $28^{th}$ Day | | |
| | Conc (cfu/g) | % Red. | Log Red. | Conc (cfu/g) | % Red. | Log Red. | Conc (cfu/g) | % Red. | Log Red. | Conc (cfu/g) | % Red. | Log Red. |
| *P. aeruginosa* | <100 | 99.966 | 3.5 | <10 | 99.997 | 4.5 | <10 | 99.997 | 4.5 | <10 | 99.997 | 4.5 |
| *S. aureus* | <100 | 99.978 | 3.7 | <10 | 99.998 | 4.7 | <10 | 99.998 | 4.7 | <10 | 99.998 | 4.7 |
| *E. Coli* | <100 | 99.984 | 3.8 | <10 | 99.998 | 4.8 | <10 | 99.998 | 4.8 | <10 | 99.998 | 4.8 |
| *C. albicans* | <100 | 99.976 | 3.6 | <10 | 99.998 | 4.6 | <10 | 99.998 | 4.6 | <10 | 99.998 | 4.6 |
| *A. brasiliensis* | 2.3E04 | 92.581 | 1.1 | 7.8E03 | 97.484 | 1.6 | 7.3E01 | 99.976 | 3.6 | <10 | 99.997 | 4.5 |

TABLE 3

Efficacy of Example 2 (1 wt. % Sodium Benzoate)

| | $2^{nd}$ Day | | | $7^{th}$ Day | | | $14^{th}$ Day | | | $28^{th}$ Day | | |
|---|---|---|---|---|---|---|---|---|---|---|---|---|
| | Conc (cfu/g) | % Red. | Log Red. | Conc (cfu/g) | % Red. | Log Red. | Conc (cfu/g) | % Red. | Log Red. | Conc (cfu/g) | % Red. | Log Red. |
| *P. aeruginosa* | <100 | 99.966 | 3.5 | <10 | 99.997 | 4.5 | <10 | 99.997 | 4.5 | <10 | 99.997 | 4.5 |
| *S. aureus* | <100 | 99.978 | 3.7 | <10 | 99.998 | 4.7 | <10 | 99.998 | 4.7 | <10 | 99.998 | 4.7 |
| *E. Coli* | <100 | 99.984 | 3.8 | <10 | 99.998 | 4.8 | <10 | 99.998 | 4.8 | <10 | 99.998 | 4.8 |
| *C. albicans* | <100 | 99.976 | 3.6 | <10 | 99.998 | 4.6 | <10 | 99.998 | 4.6 | <10 | 99.998 | 4.6 |
| *A. brasiliensis* | 3.8E04 | 87.742 | 0.9 | 7.2E03 | 97.677 | 1.6 | 2.2E03 | 99.290 | 2.1 | 8.6E02 | 99.723 | 2.6 |

TABLE 4

Efficacy of Example 3 (1 wt. % Phenoxyethanol)

| | $2^{nd}$ Day | | | $7^{th}$ Day | | | $14^{th}$ Day | | | $28^{th}$ Day | | |
|---|---|---|---|---|---|---|---|---|---|---|---|---|
| | Conc (cfu/g) | % Red. | Log Red. | Conc (cfu/g) | % Red. | Log Red. | Conc (cfu/g) | % Red. | Log Red. | Conc (cfu/g) | % Red. | Log Red. |
| *P. aeruginosa* | <100 | 99.966 | 3.5 | <10 | 99.997 | 4.5 | <10 | 99.997 | 4.5 | <10 | 99.997 | 4.5 |
| *S. aureus* | <100 | 99.978 | 3.7 | <10 | 99.998 | 4.7 | <10 | 99.998 | 4.7 | <10 | 99.998 | 4.7 |
| *E. Coli* | <100 | 99.984 | 3.8 | <10 | 99.998 | 4.8 | <10 | 99.998 | 4.8 | <10 | 99.998 | 4.8 |
| *C. albicans* | <100 | 99.976 | 3.6 | <10 | 99.998 | 4.6 | <10 | 99.998 | 4.6 | <10 | 99.998 | 4.6 |
| *A. brasiliensis* | 1.9E04 | 93.871 | 1.2 | 8.4E03 | 97.323 | 1.6 | 4.3E03 | 98.613 | 1.9 | 9.5E02 | 99.694 | 2.5 |

TABLE 5

Efficacy of Example 4 (0.2 wt. % Potassium Sorbate + 1 wt. % Sodium Benzoate)

| | $2^{nd}$ Day | | | $7^{th}$ Day | | | $14^{th}$ Day | | | $28^{th}$ Day | | |
|---|---|---|---|---|---|---|---|---|---|---|---|---|
| | Conc (cfu/g) | % Red. | Log Red. | Conc (cfu/g) | % Red. | Log Red. | Conc (cfu/g) | % Red. | Log Red. | Conc (cfu/g) | % Red. | Log Red. |
| *P. aeruginosa* | <100 | 99.966 | 3.5 | <10 | 99.997 | 4.5 | <10 | 99.997 | 4.5 | <10 | 99.997 | 4.5 |
| *S. aureus* | <100 | 99.978 | 3.7 | <10 | 99.998 | 4.7 | <10 | 99.998 | 4.7 | <10 | 99.998 | 4.7 |
| *E. Coli* | <100 | 99.984 | 3.8 | <10 | 99.998 | 4.8 | <10 | 99.998 | 4.8 | <10 | 99.998 | 4.8 |
| *C. albicans* | <100 | 99.976 | 3.6 | <10 | 99.998 | 4.6 | <10 | 99.998 | 4.6 | <10 | 99.998 | 4.6 |
| *A. brasiliensis* | 2.9E03 | 99.065 | 2.0 | 1.5E03 | 99.516 | 2.3 | 4.8E02 | 99.845 | 2.8 | <10 | 99.997 | 4.5 |

TABLE 6

Efficacy of Example 5 (0.2 wt. % Potassium Sorbate + 1 wt. % Phenoxyethanol)

| | $2^{nd}$ Day | | | $7^{th}$ Day | | | $14^{th}$ Day | | | $28^{th}$ Day | | |
|---|---|---|---|---|---|---|---|---|---|---|---|---|
| | Conc (cfu/g) | % Red. | Log Red. | Conc (cfu/g) | % Red. | Log Red. | Conc (cfu/g) | % Red. | Log Red. | Conc (cfu/g) | % Red. | Log Red. |
| *P. aeruginosa* | <100 | 99.966 | 3.5 | <10 | 99.997 | 4.5 | <10 | 99.997 | 4.5 | <10 | 99.997 | 4.5 |
| *S. aureus* | <100 | 99.978 | 3.7 | <10 | 99.998 | 4.7 | <10 | 99.998 | 4.7 | <10 | 99.998 | 4.7 |
| *E. Coli* | <100 | 99.984 | 3.8 | <10 | 99.998 | 4.8 | <10 | 99.998 | 4.8 | <10 | 99.998 | 4.6 |
| *C. albicans* | <100 | 99.976 | 3.6 | <10 | 99.998 | 4.6 | <10 | 99.998 | 4.6 | <10 | 99.998 | 4.5 |
| *A. brasiliensis* | 3.9E03 | 98.742 | 1.9 | 4.4E02 | 99.858 | 2.8 | <10 | 99.997 | 4.5 | <10 | 99.997 | 4.5 |

TABLE 7

| Efficacy of Example 6 (0.2 wt. % Potassium Sorbate + 1 wt. % Sodium Benzoate + 1 wt.% Phenoxyethanol) | | | | | | | | | | | | |
|---|---|---|---|---|---|---|---|---|---|---|---|---|
| | $2^{nd}$ Day | | | $7^{th}$ Day | | | $14^{th}$ Day | | | $28^{th}$ Day | | |
| | Conc (cfu/g) | % Red. | Log Red. | Conc (cfu/g) | % Red. | Log Red. | Conc (cfu/g) | % Red. | Log Red. | Conc (cfu/g) | % Red. | Log Red. |
| *P. aeruginosa* | <100 | 99.966 | 3.5 | <10 | 99.997 | 4.5 | <10 | 99.997 | 4.5 | <10 | 99.997 | 4.5 |
| *S. aureus* | <100 | 99.978 | 3.7 | <10 | 99.998 | 4.7 | <10 | 99.998 | 4.7 | <10 | 99.998 | 4.7 |
| *E. Coli* | <100 | 99.984 | 3.8 | <10 | 99.998 | 4.8 | <10 | 99.998 | 4.8 | <10 | 99.998 | 4.8 |
| *C. albicans* | <100 | 99.976 | 3.6 | <10 | 99.998 | 4.6 | <10 | 99.998 | 4.6 | <10 | 99.998 | 4.6 |
| *A. brasiliensis* | 1.7E03 | 99.452 | 2.3 | 7.9E02 | 99.745 | 2.6 | <10 | 99.997 | 4.5 | <10 | 99.997 | 4.5 |

Example 7

The formulations of Samples 1 and 4-6 were retested for efficacy against *P. aeruginosa, S. aureus, E. coli, C. albicans*, and *A. brasiliensis* in inoculation having a concentration of viable bacteria per gram equal to $4.8\times10^5$, $2.5\times10^5$, $6.1\times10^5$, $3.8\times10^5$, and $2.9\times10^5$, respectively, over a 14-day period. The results are set forth in Tables 8-12 below.

TABLE 8

| Efficacy of Control Sample | | | |
|---|---|---|---|
| | $2^{nd}$ Day Conc (cfu/g) | $7^{th}$ Day Conc (cfu/g) | $14^{th}$ Day Conc (cfu/g) |
| *P. aeruginosa* | 6.1E04 | 4.1E04 | 4.8E04 |
| *S. aureus* | 5.4E04 | 3.9E04 | 5.1E04 |
| *E. Coli* | 2.8E05 | 1.3E04 | 2.0E04 |
| *C. albicans* | 1.9E04 | 1.2E05 | 8.7E04 |
| *A. brasiliensis* | 2.9E05 | 1.7E05 | 2.4E04 |

TABLE 9

| Efficacy of Sample 1 (0.2 wt. % Potassium Sorbate) | | | | | | | | | |
|---|---|---|---|---|---|---|---|---|---|
| | $2^{nd}$ Day | | | $7^{th}$ Day | | | $14^{th}$ Day | | |
| | Conc (cfu/g) | % Red. | Log Red. | Conc (cfu/g) | % Red. | Log Red. | Conc (cfu/g) | % Red. | Log Red. |
| *P. aeruginosa* | 6.1E+03 | 98.729% | 1.9 | 1.0E+01 | 99.998% | 4.7 | 1.0E+01 | 99.998% | 4.7 |
| *S. aureus* | 1.0E+01 | 99.996% | 4.4 | 1.0E+01 | 99.996% | 4.4 | 1.0E+01 | 99.996% | 4.4 |
| *E. Coli* | 3.7E+03 | 99.393% | 2.2 | 2.7E+01 | 99.996% | 4.4 | 1.0E+01 | 99.998% | 4.8 |
| *C. albicans* | 4.5E+03 | 98.816% | 1.9 | 1.0E+01 | 99.997% | 4.6 | 1.0E+01 | 99.997% | 4.6 |
| *A. brasiliensis* | 2.8E+05 | 3.448% | 0.0 | 2.7E+05 | 6.897% | 0.0 | 1.8E+05 | 37.931% | 0.2 |

TABLE 10

| Efficacy of Sample 4 (0.2 wt. % Potassium Sorbate + 1 wt. % Sodium Benzoate) | | | | | | | | | |
|---|---|---|---|---|---|---|---|---|---|
| | $2^{nd}$ Day | | | $7^{th}$ Day | | | $14^{th}$ Day | | |
| | Conc (cfu/g) | % Red. | Log Red. | Conc (cfu/g) | % Red. | Log Red. | Conc (cfu/g) | % Red. | Log Red. |
| *P. aeruginosa* | 1.0E+01 | 99.998% | 4.7 | 1.0E+01 | 99.998% | 4.7 | 1.0E+01 | 99.998% | 4.7 |
| *S. aureus* | 1.0E+01 | 99.996% | 4.4 | 1.0E+01 | 99.996% | 4.4 | 1.0E+01 | 99.996% | 4.4 |
| *E. Coli* | 1.0E+01 | 99.998% | 4.8 | 1.0E+01 | 99.998% | 4.8 | 1.0E+01 | 99.998% | 4.8 |
| *C. albicans* | 1.0E+01 | 99.997% | 4.6 | 1.0E+01 | 99.997% | 4.6 | 1.0E+01 | 99.997% | 4.6 |
| *A. brasiliensis* | 8.0E+04 | 72.414% | 0.6 | 2.4E+04 | 91.724% | 1.1 | 5.5E+02 | 99.810% | 2.7 |

TABLE 11

| Efficacy of Sample 5 (0.2 wt. % Potassium Sorbate + 1 wt. % Phenoxyethanol) | | | | | | | | | |
|---|---|---|---|---|---|---|---|---|---|
| | $2^{nd}$ Day | | | $7^{th}$ Day | | | $14^{th}$ Day | | |
| | Conc (cfu/g) | % Red. | Log Red. | Conc (cfu/g) | % Red. | Log Red. | Conc (cfu/g) | % Red. | Log Red. |
| *P. aeruginosa* | 1.0E+01 | 99.998% | 4.7 | 1.0E+01 | 99.998% | 4.7 | 1.0E+01 | 99.998% | 4.7 |
| *S. aureus* | 1.0E+01 | 99.996% | 4.4 | 1.0E+01 | 99.996% | 4.4 | 1.0E+01 | 99.996% | 4.4 |
| *E. Coli* | 1.0E+01 | 99.998% | 4.8 | 1.0E+01 | 99.998% | 4.8 | 1.0E+01 | 99.998% | 4.8 |
| *C. albicans* | 1.0E+01 | 99.997% | 4.6 | 1.0E+01 | 99.997% | 4.6 | 1.0E+01 | 99.997% | 4.6 |
| *A. brasiliensis* | 2.4E+04 | 91.724% | 1.1 | 2.3E+04 | 92.069% | 1.1 | 1.9E+04 | 93.448% | 1.2 |

TABLE 12

| Efficacy of Sample 6 (0.2 wt. % Potassium Sorbate + 1 wt. % Sodium Benzoate + 1 wt. % Phenoxyethanol) | | | | | | | | | |
|---|---|---|---|---|---|---|---|---|---|
| | $2^{nd}$ Day | | | $7^{th}$ Day | | | $14^{th}$ Day | | |
| | Conc (cfu/g) | % Red. | Log Red. | Conc (cfu/g) | % Red. | Log Red. | Conc (cfu/g) | % Red. | Log Red. |
| *P. aeruginosa* | 1.0E+01 | 99.998% | 4.7 | 1.0E+01 | 99.998% | 4.7 | 1.0E+01 | 99.998% | 4.7 |
| *S. aureus* | 1.0E+01 | 99.996% | 4.4 | 1.0E+01 | 99.996% | 4.4 | 1.0E+01 | 99.996% | 4.4 |
| *E. Coli* | 1.0E+01 | 99.998% | 4.8 | 1.0E+01 | 99.998% | 4.8 | 1.0E+01 | 99.998% | 4.8 |
| *C. albicans* | 1.0E+01 | 99.997% | 4.6 | 1.0E+01 | 99.997% | 4.6 | 1.0E+01 | 99.997% | 4.6 |
| *A. brasiliensis* | 3.4E+03 | 98.828% | 1.9 | 2.3E+03 | 99.207% | 2.1 | 1.3E+03 | 99.552% | 2.3 |

Examples 8-11

Samples 8-11 were formed from deionized water, sodium dodecylbenzene sulfonate (anionic surfactant), sodium laureth sulfate (anionic surfactant), alcohol ethoxylate $C_{12}$-$C_{18}$ 7EO (nonionic surfactant), tetrasodium glutamate diacetate (chelating agent), and a preservative system. The preservative systems tested were potassium sorbate (Example 8), a blend of potassium sorbate and sodium benzoate (Example 9), a blend of potassium sorbate and phenoxyethanol (Example 10), and a blend of potassium sorbate, sodium benzoate, and phenoxyethanol (Example 11). Each formulation had a pH of 7.0 and had a viscosity of 270 to 300 cP as determined using a Brookfield RV viscometer (spindle #2, 60 rpm). The viscosity was obtained through the addition of sodium chloride (NaCl) in a quantity sufficient to reach the desired viscosity level. The ingredients and relative concentration of the formulations are set forth in the table below:

| | Example | | | |
|---|---|---|---|---|
| | 8 | 9 | 10 | 11 |
| Deionized water (wt. %) | q.s. 100 wt. % | q.s. 100 wt. % | q.s. 100 wt. % | q.s. 100 wt. % |

-continued

| | Example | | | |
|---|---|---|---|---|
| | 8 | 9 | 10 | 11 |
| Sodium Dodecylbenzene Sulfonate (50%) (wt. %) | 10 | 10 | 10 | 10 |
| Sodium Laureth Sulfate (70%) (wt. %) | 5 | 5 | 5 | 5 |
| Alcohol $C_{12}$-$C_{18}$ ethoxylate 7EO (wt. %) | 5 | 5 | 5 | 5 |
| Tetrasodium Glutamate Diacetate (47%) (wt. %) | 0.1 | 0.1 | 0.1 | 0.1 |
| Potassium Sorbate (wt. %) | 0.2 | 0.2 | 0.2 | 0.2 |
| Sodium Benzoate (wt. %) | — | 1 | — | 1 |
| Phenoxyethanol (wt. %) | — | — | 1 | 1 |

In accordance with European Pharmacopoeia 7.0, Efficacy of Antimicrobial Preservation (5.1.3) (2011), the formulations were tested for efficacy against *P. aeruginosa, S. aureus, E. coli, C. albicans*, and *A. brasiliensis* in inoculation having a concentration of viable bacteria per gram equal to $3.8\times10^5$, $5.0\times10^5$, $6.7\times10^5$, $2.9\times10^5$, and $2.5\times10^5$, respectively. The formulations were tested in duplicate over a 28-day period. The results are set forth in Tables 13-16 below.

TABLE 13

| Efficacy of Example 8 (0.2 wt. % Potassium Sorbate) | | | | | | | | | | | | |
|---|---|---|---|---|---|---|---|---|---|---|---|---|
| | $2^{nd}$ Day | | | $7^{th}$ Day | | | $14^{th}$ Day | | | $28^{th}$ Day | | |
| | Conc (cfu/g) | % Red. | Log Red. | Conc (cfu/g) | % Red. | Log Red. | Conc (cfu/g) | % Red. | Log Red. | Conc (cfu/g) | % Red. | Log Red. |
| *P. aeruginosa* | 1.0E+02 | 99.974% | 3.6 | 1.0E+01 | 99.997% | 4.6 | 1.0E+01 | 99.997% | 4.6 | 1.0E+01 | 99.997% | 4.6 |
| *S. aureus* | 1.0E+02 | 99.980% | 3.7 | 1.0E+01 | 99.998% | 4.7 | 1.0E+01 | 99.998% | 4.7 | 1.0E+01 | 99.998% | 4.7 |

TABLE 13-continued

Efficacy of Example 8 (0.2 wt. % Potassium Sorbate)

| | 2nd Day | | | 7th Day | | | 14th Day | | | 28th Day | | |
|---|---|---|---|---|---|---|---|---|---|---|---|---|
| | Conc (cfu/g) | % Red. | Log Red. | Conc (cfu/g) | % Red. | Log Red. | Conc (cfu/g) | % Red. | Log Red. | Conc (cfu/g) | % Red. | Log Red. |
| *E. Coli* | 1.0E+02 | 99.985% | 3.8 | 1.0E+01 | 99.999% | 4.8 | 1.0E+01 | 99.999% | 4.8 | 1.0E+01 | 99.999% | 4.8 |
| *C. albicans* | 1.0E+02 | 99.966% | 3.5 | 1.0E+01 | 99.997% | 4.5 | 1.0E+01 | 99.997% | 4.5 | 1.0E+01 | 99.997% | 4.5 |
| *A. brasiliensis* | 8.5E+04 | 66.000% | 0.5 | 4.1E+04 | 83.600% | 0.8 | 5.6E+02 | 99.776% | 2.6 | 1.9E+02 | 99.924% | 3.1 |

TABLE 14

Efficacy of Example 9
(0.2 wt. % Potassium Sorbate + 1 wt. % Phenoxyethanol)

| | 2nd Day | | | 7th Day | | | 14th Day | | | 28th Day | | |
|---|---|---|---|---|---|---|---|---|---|---|---|---|
| | Conc (cfu/g) | % Red. | Log Red. | Conc (cfu/g) | % Red. | Log Red. | Conc (cfu/g) | % Red. | Log Red. | Conc (cfu/g) | % Red. | Log Red. |
| *P. aeruginosa* | 1.0E+05 | 73.684% | 0.6 | 9.2E+04 | 75.789% | 0.6 | 4.5E+03 | 98.816% | 1.9 | 1.1E+03 | 99.711% | 2.5 |
| *S. aureus* | 7.8E+04 | 84.400% | 0.8 | 1.1E+05 | 78.000% | 0.7 | 2.9E+03 | 99.420% | 2.2 | 1.3E+03 | 99.740% | 2.6 |
| *E. Coli* | 1.2E+05 | 82.090% | 0.7 | 1.6E+05 | 76.119% | 0.6 | 8.8E+03 | 98.687% | 1.9 | 2.6E+03 | 99.612% | 2.4 |
| *C. albicans* | 7.9E+03 | 97.276% | 1.6 | 3.2E+03 | 98.897% | 2.0 | 1.9E+02 | 99.934% | 3.2 | 1.0E+01 | 99.997% | 4.5 |
| *A. brasiliensis* | 6.6E+04 | 73.600% | 0.6 | 6.7E+04 | 73.200% | 0.6 | 2.8E+03 | 98.880% | 2.0 | 9.6E+02 | 99.616% | 2.4 |

TABLE 15

Efficacy of Example 10
(0.2 wt. % Potassium Sorbate + 1 wt. % Sodium Benzoate)

| | 2nd Day | | | 7th Day | | | 14th Day | | | 28th Day | | |
|---|---|---|---|---|---|---|---|---|---|---|---|---|
| | Conc (cfu/g) | % Red. | Log Red. | Conc (cfu/g) | % Red. | Log Red. | Conc (cfu/g) | % Red. | Log Red. | Conc (cfu/g) | % Red. | Log Red. |
| *P. aeruginosa* | 1.6E+03 | 99.579% | 2.4 | 1.0E+01 | 99.997% | 4.6 | 1.0E+01 | 99.997% | 4.6 | 1.0E+01 | 99.997% | 4.6 |
| *S. aureus* | 1.0E+04 | 98.000% | 1.7 | 1.3E+03 | 99.740% | 2.6 | 1.0E+01 | 99.998% | 4.7 | 1.0E+01 | 99.998% | 4.7 |
| *E. Coli* | 2.9E+04 | 95.672% | 1.4 | 1.7E+04 | 97.463% | 1.6 | 1.0E+01 | 99.999% | 4.8 | 1.0E+01 | 99.999% | 4.8 |
| *C. albicans* | 8.5E+03 | 97.069% | 1.5 | 1.0E+01 | 99.997% | 4.5 | 1.0E+01 | 99.997% | 4.5 | 1.0E+01 | 99.997% | 4.5 |
| *A. brasiliensis* | 5.8E+04 | 76.800% | 0.6 | 1.9E+04 | 92.400% | 1.1 | 4.8E+03 | 98.080% | 1.7 | 9.5E+02 | 99.620% | 2.4 |

TABLE 16

Efficacy of Example 11
(0.2 wt. % Potassium Sorbate + 1 wt. % Sodium Benzoate + 1 wt. % Phenoxyethanol)

| | 2nd Day | | | 7th Day | | | 14th Day | | | 28th Day | | |
|---|---|---|---|---|---|---|---|---|---|---|---|---|
| | Conc (cfu/g) | % Red. | Log Red. | Conc (cfu/g) | % Red. | Log Red. | Conc (cfu/g) | % Red. | Log Red. | Conc (cfu/g) | % Red. | Log Red. |
| *P. aeruginosa* | 1.0E+02 | 99.974% | 3.6 | 1.0E+01 | 99.997% | 4.6 | 1.0E+01 | 99.997% | 4.6 | 1.0E+01 | 99.997% | 4.6 |
| *S. aureus* | 8.7E+02 | 99.826% | 2.8 | 1.0E+01 | 99.998% | 4.7 | 1.0E+01 | 99.998% | 4.7 | 1.0E+01 | 99.998% | 4.7 |
| *E. Coli* | 1.3E+03 | 99.806% | 2.7 | 1.0E+01 | 99.999% | 4.8 | 1.0E+01 | 99.999% | 4.8 | 1.0E+01 | 99.999% | 4.8 |
| *C. albicans* | 1.0E+02 | 99.966% | 3.5 | 1.0E+01 | 99.997% | 4.5 | 1.0E+01 | 99.997% | 4.5 | 1.0E+01 | 99.997% | 4.5 |
| *A. brasiliensis* | 1.9E+04 | 92.400% | 1.1 | 8.6E+03 | 96.560% | 1.5 | 6.1E+03 | 97.560% | 1.6 | 7.6E+02 | 99.696% | 2.5 |

Example 12

The formulations of Samples 8-11 were retested for efficacy against *P. aeruginosa, S. aureus, E. coli, C. albicans*, and *A. brasiliensis* in inoculation having a concentration of viable bacteria per gram equal to $4.4\times10^5$, $5.5\times10^5$, $6.5\times10^5$, $2.9\times10^5$, and $3.0\times10^5$, respectively, over a 28-day period. The results are set forth in Tables 17-20 below.

TABLE 17

Efficacy of Example 8 (0.2 wt. % Potassium Sorbate)

| | 2nd Day | | | 7th Day | | | 14th Day | | | 28th Day | | |
|---|---|---|---|---|---|---|---|---|---|---|---|---|
| | Conc (cfu/g) | % Red. | Log Red. | Conc (cfu/g) | % Red. | Log Red. | Conc (cfu/g) | % Red. | Log Red. | Conc (cfu/g) | % Red. | Log Red. |
| *P. aeruginosa* | 2.6E+03 | 99.409% | 2.2 | 1.1E+03 | 99.750% | 2.6 | 9.4E+02 | 99.786% | 2.7 | 4.2E+02 | 99.905% | 3.0 |
| *S. aureus* | 1.9E+04 | 96.545% | 1.5 | 7.6E+03 | 98.618% | 1.9 | 5.1E+03 | 99.073% | 2.0 | 6.3E+03 | 98.855% | 1.9 |
| *E. Coli* | 8.1E+04 | 87.538% | 0.9 | 4.5E+04 | 93.077% | 1.2 | 2.6E+04 | 96.000% | 1.4 | 6.5E+04 | 90.000% | 1.0 |
| *C. albicans* | 6.5E+04 | 77.586% | 0.6 | 9.2E+03 | 96.828% | 1.5 | 6.7E+03 | 97.690% | 1.6 | 8.5E+03 | 97.069% | 1.5 |
| *A. brasiliensis* | 9.5E+04 | 68.333% | 0.5 | 3.3E+04 | 89.000% | 1.0 | 1.6E+04 | 94.667% | 1.3 | 8.7E+03 | 97.100% | 1.5 |

TABLE 18

Efficacy of Example 9 (0.2 wt. % Potassium Sorbate + 1 wt. % Sodium Benzoate)

| | 2nd Day | | | 7th Day | | | 14th Day | | | 28th Day | | |
|---|---|---|---|---|---|---|---|---|---|---|---|---|
| | Conc (cfu/g) | % Red. | Log Red. | Conc (cfu/g) | % Red. | Log Red. | Conc (cfu/g) | % Red. | Log Red. | Conc (cfu/g) | % Red. | Log Red. |
| *P. aeruginosa* | 1.0E+02 | 99.977% | 3.6 | 1.0E+01 | 99.998% | 4.6 | 1.0E+01 | 99.998% | 4.6 | 1.0E+01 | 99.998% | 4.6 |
| *S. aureus* | 1.0E+02 | 99.982% | 3.7 | 1.0E+01 | 99.998% | 4.7 | 1.0E+01 | 99.998% | 4.7 | 1.0E+01 | 99.998% | 4.7 |
| *E. Coli* | 1.0E+02 | 99.985% | 3.8 | 1.0E+01 | 99.998% | 4.8 | 1.0E+01 | 99.998% | 4.8 | 1.0E+01 | 99.998% | 4.8 |
| *C. albicans* | 1.0E+02 | 99.966% | 3.5 | 1.0E+01 | 99.997% | 4.5 | 1.0E+01 | 99.997% | 4.5 | 1.0E+01 | 99.997% | 4.5 |
| *A. brasiliensis* | 8.5E+04 | 71.667% | 0.5 | 4.1E+04 | 86.333% | 0.9 | 5.6E+02 | 99.813% | 2.7 | 1.9E+02 | 99.937% | 3.2 |

TABLE 19

Efficacy of Example 10 (0.2 wt. % Potassium Sorbate + 1 wt. % Phenoxyethanol)

| | 2nd Day | | | 7th Day | | | 14th Day | | | 28th Day | | |
|---|---|---|---|---|---|---|---|---|---|---|---|---|
| | Conc (cfu/g) | % Red. | Log Red. | Conc (cfu/g) | % Red. | Log Red. | Conc (cfu/g) | % Red. | Log Red. | Conc (cfu/g) | % Red. | Log Red. |
| *P. aeruginosa* | 1.0E+02 | 99.977% | 3.6 | 1.0E+01 | 99.998% | 4.6 | 1.0E+01 | 99.998% | 4.6 | 1.0E+01 | 99.998% | 4.6 |
| *S. aureus* | 1.0E+02 | 99.982% | 3.7 | 1.0E+01 | 99.998% | 4.7 | 1.0E+01 | 99.998% | 4.7 | 1.0E+01 | 99.998% | 4.7 |
| *E. Coli* | 1.0E+04 | 98.462% | 1.8 | 7.9E+03 | 98.785% | 1.9 | 9.6E+02 | 99.852% | 2.8 | 2.2E+02 | 99.966% | 3.5 |
| *C. albicans* | 1.0E+01 | 99.997% | 4.5 | 1.0E+01 | 99.997% | 4.5 | 1.0E+01 | 99.997% | 4.5 | 1.0E+01 | 99.997% | 4.5 |
| *A. brasiliensis* | 8.8E+04 | 70.667% | 0.5 | 3.5E+04 | 88.333% | 0.9 | 8.6E+03 | 97.133% | 1.5 | 9.3E+03 | 96.900% | 1.5 |

TABLE 20

Efficacy of Example 11 (0.2 wt. % Potassium Sorbate + 1 wt. % Sodium Benzoate + 1 wt. % Phenoxyethanol)

| | 2nd Day | | | 7th Day | | | 14th Day | | | 28th Day | | |
|---|---|---|---|---|---|---|---|---|---|---|---|---|
| | Conc (cfu/g) | % Red. | Log Red. | Conc (cfu/g) | % Red. | Log Red. | Conc (cfu/g) | % Red. | Log Red. | Conc (cfu/g) | % Red. | Log Red. |
| *P. aeruginosa* | 1.0E+02 | 99.977% | 3.6 | 1.0E+01 | 99.998% | 4.6 | 1.0E+01 | 99.998% | 4.6 | 1.0E+01 | 99.998% | 4.6 |
| *S. aureus* | 1.0E+02 | 99.982% | 3.7 | 1.0E+01 | 99.998% | 4.7 | 1.0E+01 | 99.998% | 4.7 | 1.0E+01 | 99.998% | 4.7 |
| *E. Coli* | 1.0E+02 | 99.985% | 3.8 | 1.0E+01 | 99.998% | 4.8 | 1.0E+01 | 99.998% | 4.8 | 1.0E+01 | 99.998% | 4.8 |
| *C. albicans* | 1.0E+02 | 99.966% | 3.5 | 1.0E+01 | 99.997% | 4.5 | 1.0E+01 | 99.997% | 4.5 | 1.0E+01 | 99.997% | 4.5 |
| *A. brasiliensis* | 4.8E+04 | 84.000% | 0.8 | 7.9E+03 | 97.367% | 1.6 | 4.5E+03 | 98.500% | 1.8 | 1.9E+03 | 99.367% | 2.2 |

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A fabric detergent formulation comprising:

a preservative system that includes one or more sorbates in an amount of from about 0.01 wt. % to about 0.8 wt. % of the fabric detergent formulation;

one or more anionic surfactants, wherein the weight ratio of the anionic surfactants to the sorbates is about 10 or more; and a solvent system that includes water in an amount of from about 50 wt. % to 100 wt. % of the fabric detergent formulation; and wherein the pH of the fabric detergent formulation is about 7 to about 8.5.

2. The fabric detergent formulation of claim 1, wherein the fabric detergent formulation exhibits a log reduction of at least 2 at 2 days, 7 days, 14 days, and/or 28 days after exposure to *S. aureus* in accordance with European Pharmacopoeia 7.0, Efficacy of Antimicrobial Preservation (5.1.3) (2011).

3. The fabric detergent formulation of claim 1, wherein the fabric detergent formulation exhibits a log reduction of at least 2 at 2 days, 7 days, 14 days, and/or 28 days after exposure to *E. coli* in accordance with European Pharmacopoeia 7.0, Efficacy of Antimicrobial Preservation (5.1.3) (2011).

4. The fabric detergent formulation of claim 1, wherein the fabric detergent formulation exhibits a log reduction of at least 2 at 2 days, 7 days, 14 days, and/or 28 days after exposure to *P. aeruginosa* in accordance with European Pharmacopoeia 7.0, Efficacy of Antimicrobial Preservation (5.1.3) (2011).

5. The fabric detergent formulation of claim 1, wherein the fabric detergent formulation exhibits a log reduction of at least 1 at 14 days and/or 28 days after exposure to *C. albicans* in accordance with European Pharmacopoeia 7.0, Efficacy of Antimicrobial Preservation (5.1.3) (2011).

6. The fabric detergent formulation of claim 1, wherein the fabric detergent formulation exhibits a log reduction of at least 1 at 14 days and/or 28 days after exposure to *A. brasiliensis* in accordance with European Pharmacopoeia 7.0, Efficacy of Antimicrobial Preservation (5.1.3) (2011).

7. The fabric detergent formulation of claim 1, wherein the preservative system includes potassium sorbate.

8. The fabric detergent formulation of claim 1, wherein the preservative system includes one or more additional preservatives.

9. The fabric detergent formulation of claim 8, wherein the additional preservatives include a benzoate, phenyl alcohol, benzoic ester, or a combination thereof.

10. The fabric detergent formulation of claim 9, wherein the additional preservatives include sodium benzoate, phenoxyethanol, or a combination thereof.

11. The fabric detergent formulation of claim 9, wherein the weight ratio of the additional preservatives to the sorbates within the preservative system is from about 0.5 to about 20.

12. The fabric detergent formulation of claim 1, wherein the fabric detergent formulation is free of isothiazolinones.

13. The fabric detergent formulation of claim 1, wherein the anionic surfactants include an alkyl sulfate, alkyl ether sulfate, alkyl sulfonate, ester sulfonate, lignin sulfonate, fatty acid cyanamide, sulfosuccinic acid surfactant, acylaminoalkane sulfonate, fatty acid sarcosinate, ether carboxylic acid, alkyl (ether) phosphate, alkyl carboxylate, or a mixture thereof.

14. The fabric detergent formulation of claim 1, wherein anionic surfactants constitute from about 2 wt. % to about 30 wt. % of the formulation.

15. The fabric detergent formulation of claim 1, wherein the formulation further comprises one or more nonionic surfactants.

16. The fabric detergent formulation of claim 1, wherein the formulation further comprises one or more metal chelating agents.

17. The fabric detergent formulation of claim 1, wherein the formulation has a viscosity of from about 50 to about 800 centipoise as determined with a Brookfield RV viscometer (spindle #2, 60 rpm).

18. The fabric detergent formulation of claim 1, wherein the weight ratio of the anionic surfactants to the sorbates is from 30 to 100.

19. The fabric detergent formulation of claim 1, wherein the anionic surfactants comprises sodium dodecylbenzene sulfonate, sodium laureth sulfate, or a combination thereof.

* * * * *